United States Patent
Gallo et al.

(10) Patent No.: US 9,053,248 B2
(45) Date of Patent: Jun. 9, 2015

(54) SRAM HANDSHAKE

(75) Inventors: Francesco Gallo, Gratkorn (AT); Paul Bakker, Eindhoven (NL); Giancarlo Cutrignelli, Gratkorn (AT)

(73) Assignee: NXP B.V., Eindhoven (NL)

( * ) Notice: Subject to any disclaimer, the term of this patent is extended or adjusted under 35 U.S.C. 154(b) by 179 days.

(21) Appl. No.: 13/600,381

(22) Filed: Aug. 31, 2012

(65) Prior Publication Data

US 2014/0068145 A1   Mar. 6, 2014

(51) Int. Cl.
G06F 12/00 (2006.01)
G06F 13/40 (2006.01)
G06F 3/06 (2006.01)

(52) U.S. Cl.
CPC ............ G06F 13/4059 (2013.01); G06F 3/064 (2013.01); G06F 3/0601 (2013.01); G06F 3/061 (2013.01)

(58) Field of Classification Search
None
See application file for complete search history.

(56) References Cited

U.S. PATENT DOCUMENTS

| | | | |
|---|---|---|---|
| 5,206,495 A | 4/1993 | Kreft | |
| 5,884,027 A | 3/1999 | Garbus et al. | |
| 6,045,043 A | 4/2000 | Bashan et al. | |
| 6,105,874 A | 8/2000 | Berger et al. | |
| 7,789,313 B2 | 9/2010 | Degauque et al. | |
| 7,825,776 B2 * | 11/2010 | Smith et al. | 340/10.51 |
| 8,108,307 B1 | 1/2012 | Kawan et al. | |
| 8,453,939 B2 | 6/2013 | Lee | |
| 2001/0007565 A1 * | 7/2001 | Weng et al. | 370/429 |
| 2006/0186211 A1 | 8/2006 | Kim et al. | |
| 2006/0206343 A1 | 9/2006 | Nakanishi et al. | |
| 2006/0208066 A1 | 9/2006 | Finn et al. | |
| 2008/0232405 A1 * | 9/2008 | Gallo | 370/498 |
| 2009/0137276 A1 | 5/2009 | Baldischweiler et al. | |
| 2010/0023681 A1 * | 1/2010 | Sinclair et al. | 711/103 |
| 2010/0029202 A1 | 2/2010 | Jolivet et al. | |
| 2010/0090810 A1 | 4/2010 | Gallo et al. | |
| 2010/0240318 A1 | 9/2010 | Tomoeda | |
| 2011/0113210 A1 | 5/2011 | Klapman et al. | |
| 2011/0213938 A1 | 9/2011 | Kuris et al. | |

(Continued)

FOREIGN PATENT DOCUMENTS

| | | |
|---|---|---|
| EP | 2 582 160 A1 | 4/2013 |
| WO | 2009044228 A2 | 4/2009 |
| WO | 2010096648 A2 | 8/2010 |

OTHER PUBLICATIONS

The DS8007 and Smart Card Interface Fundamentals, Maxim 2007.*

(Continued)

*Primary Examiner* — Duc Doan (57) ABSTRACT

Various exemplary embodiments relate to an integrated circuit including: a RF interface; a wired interface connectable to a host; a volatile memory having a first block and a last block configured to store data transferred between the RF interface and the wired interface; and a memory controller configured to detect when the last block of the volatile memory has been written and to indicate that the volatile memory is ready to read. Various exemplary embodiments relate to a method performed by a tag including: determining that data is to be received on the first interface; blocking the second interface; writing data from the first interface to a volatile memory; detecting that the last block of the volatile memory has been written; unblocking the second interface; indicating that data is available for reading; blocking the first interface; and reading data from the volatile memory to the second interface.

20 Claims, 4 Drawing Sheets

(56) References Cited

U.S. PATENT DOCUMENTS

2014/0062661 A1 3/2014 Gallo et al.
2014/0235162 A1 8/2014 Gallo et al.

OTHER PUBLICATIONS

NFC Forum "NFC Data Exchange Format (NDEF)" Technical Specification, 2006.
NFC Forum Technical Specification "Type 1 Tag Operational" v.1.1, 2011.
NFC Forum Technical Specification "Type 2 Tag Operational" v.1.1, 2011.
NFC Forum Technical Specification "Type 3 Tag Operational" v.1.1, 2011.
NFC Forum Technical Specification "Type 4 Tag Operational" v.2.0, 2010.
NFC Forum Technical Specification "Connection Handover" v1.2, 2010.
NFC Forum, Bluetooth SIG Application Document "Bluetooth Secure Simple Pairing Using NFC", 2011.
"EP Search Report", for EP 13 18 2166.
U.S. Appl. No. 14/507,773, filed Oct. 6, 2014.
"Simple NDEF Exchange Protocol—Technical Specification, version 1.0", NFC Forum, 20 pgs, retrieved from the internet at: http://www.cardsys.dk/download/NFC_Docs/NFC%20Simple%20NDEF%20Exchange%20Protocol%20Specification.pdf. (Aug. 31, 2011).
"ISO14443-3, International cards—Contactless Integrated Circuit Cards—Proximity Cards, Part 3: Initialization and Anticollision", ISO/IEC, 70 pgs, retrieved from the internet at: http://www.iso.org/iso/catalogue_detail.htm?csnumber=50942 (Apr. 15, 2011).

* cited by examiner

SRAM HANDSHAKE

TECHNICAL FIELD

Various exemplary embodiments disclosed herein relate generally to contactless cards and contactless tags.

BACKGROUND

Contactless tags are used in identification products such as smart cards and Radio Frequency Identification (RFID) tags for a variety of purposes. International standard ISO14443A is the industry standard for contactless smart cards. ISO14443A compliant products provide RF communication technology for transmitting data between a card or tag and a reader device.

Near Field Communication (NFC) is a very short-range wireless technology for distances typically measured in centimeters. NFC is optimized for intuitive, easy and secure communications between various devices without user configuration. NFC is typically compatible with contactless smart card platforms. NFC devices can interoperate with ISO14443A compliant systems. Such functionality is called Tag Read/Write.

The NFC Forum is a non-profit industry association advancing the use of NFC short-range wireless interaction in a variety of devices. The NFC Forum provides a number of technical specifications defining the operation of NFC devices. The NFC Forum has defined specifications for passive contactless cards called NFC Forum tags.

SUMMARY

A brief summary of various exemplary embodiments in accordance with the invention is presented. Some simplifications and omissions may be made in the following summary, which is intended to highlight and introduce some aspects of the various exemplary embodiments, but not to limit the scope of the invention.

Various exemplary embodiments relate to an integrated circuit (IC) including: a radio frequency (RF) interface; a wired interface connectable to a host; a volatile memory having a first block and a last block configured to store data transferred between the RF interface and the wired interface; and a memory controller configured to detect when the last block of the volatile memory has been written and to indicate that the volatile memory is ready to read.

In various embodiments, the IC further includes an electronically erasable programmable read only memory (EEPROM).

In various embodiments, the IC is a near field communication (NFC) tag.

In various embodiments, the memory controller is further configured to detect when the last block of the volatile memory has been read and to place the IC in an idle state.

In various embodiments, the wired interface is an Inter-Integrated Circuit (I2C) or a system management bus (SMB).

In various embodiments, the memory controller is further configured to provide a trigger signal to the host via the wired interface when the RF interface writes to the last block of the volatile memory.

In various embodiments, the IC further includes a field detection pin that indicates the presence of an RF field, wherein the memory controller is further configured to use the field detection pin to provide a trigger signal to the host.

In various embodiments, the IC further includes a first register configured to indicate the status of the RF interface and a second register configured to indicate the status of the wired interface, wherein the memory controller is configured to lock one of the RF interface and the wired interface based on the first register and the second register.

In various embodiments, the IC further includes a third register configured to indicate whether data stored in the volatile memory has been read.

Various exemplary embodiments in accordance with the invention relate to a method performed by a tag for transferring data between a first interface and a second interface. The method includes: determining that data is to be received on the first interface; blocking the second interface; writing data from the first interface to a volatile memory; detecting that the last block of the volatile memory has been written; unblocking the second interface; indicating that data is available for reading on the second interface; blocking the first interface; and reading data from the volatile memory to the second interface.

In various embodiments, the first interface is a radio frequency interface (RF) in communication with an RF device and the second interface is a wired interface in communication with a host.

In various embodiments, the method further includes sending a trigger signal to the host via the wired interface when detecting that the last block of the volatile memory has been written by the RF device.

In various embodiments, the first interface is a wired interface in communication with a host and the second interface is a radio frequency interface (RF) in communication with an RF device.

In various embodiments, the method further includes: detecting that the last block of the volatile memory has been read; and setting the tag to an idle state.

In various embodiments, the tag is an NFC forum tag.

In various embodiments, the step of indicating that data is available for reading on the second interface includes setting a register associated with the second interface that can be read by the second interface.

In various embodiments, the step of blocking the second interface includes setting a register associated with the first interface to indicate that the first interface is in use.

In various embodiments, the method further includes reading a register configured to indicate whether a handshake feature is permitted.

Various exemplary embodiments in accordance with the invention relate to a host device including: a first wired interface; and a dual interface tag including: a radio frequency (RF) interface, a second wired interface connected to the first wired interface of the host, a volatile memory having a first block and a last block configured to store data transferred between the RF interface and the wired interface, and a memory controller configured to detect when the last block of the volatile memory has been written and to indicate that the volatile memory is ready to read.

In various embodiments, the host device is one of: a phone, a computer, an automobile, an audio player, a video player, a copier, a facsimile machine, and a printer.

In this manner, various exemplary embodiments enable a dual interface tag and method of using the tag to transfer data between devices. In particular, by controlling access to a random access memory, data can be transferred from a device in communication with a first interface to a device in communication with a second interface of a dual interface tag.

BRIEF DESCRIPTION OF THE DRAWINGS

In order to better understand various exemplary embodiments, reference is made to the accompanying drawings, wherein.

DETAILED DESCRIPTION

Referring now to the drawings, in which like numerals refer to like components or steps, there are disclosed broad aspects of various exemplary embodiments in accordance with the invention.

Figure 1:
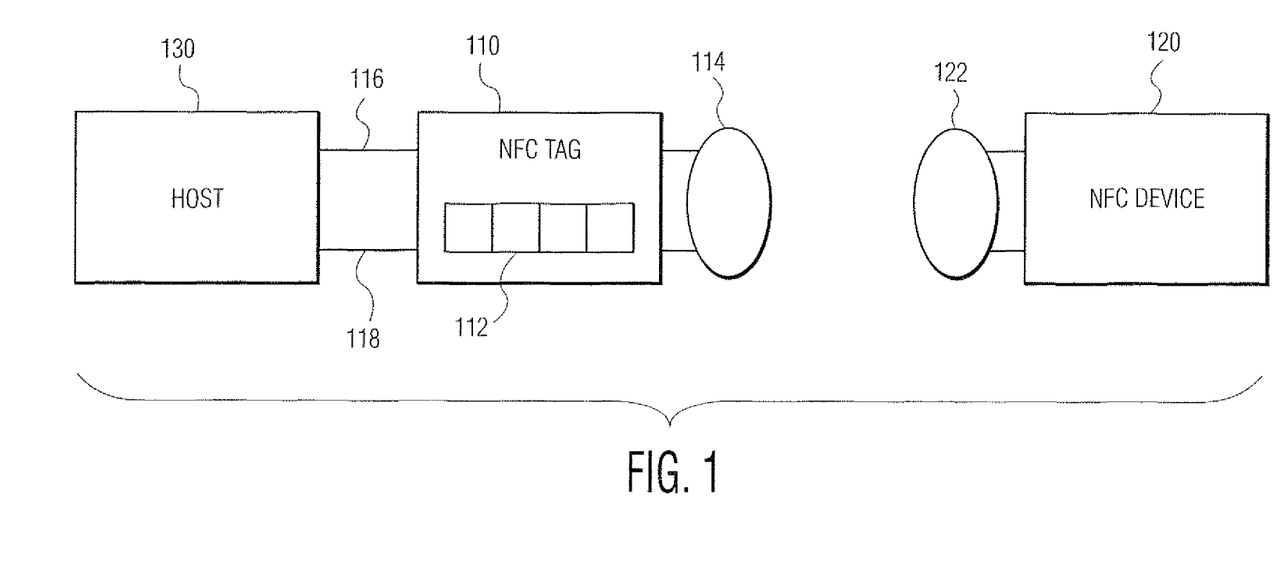
FIG. 1 illustrates an exemplary environment in accordance with the invention for a dual interface tag.

FIG. 1 illustrates an exemplary environment for a dual interface tag 110. Tag 110 may be a contactless tag that also includes a wired interface. Tag 110 may be in communication with NFC device 120 and host 130. Tag 110 may communicate with one or more NFC devices 120 via a wireless link using, for example, RF signals. Tag 110 may communicate with host 130 via a wired interface. Accordingly, tag 110 may be physically connected to host 130. Tag 110 may be embedded within host 130 or attached to a surface of host 130. Tag 110 may also be removably connected to host 130, such as, for example, by plugging into a port of host 130.

Tag 110 may be an integrated circuit that stores information in an internal memory 112 that can be read by an external device such as NFC device 130. Tag 110 may be compliant with NFC Forum specifications for NFC Forum tags. Accordingly, tag 110 may receive and process a common set of commands used by NFC Forum tags. Various components such as the size of memory 112 may be configured to comply with any NFC Forum specification. Tag 110 may also be read by host 130. Tag 110 may include memory 112, RF interface 114, wired interface 116, and field detection pin 118.

Memory 112 may include both volatile and non-volatile memory. In various exemplary embodiments in accordance with the invention, memory 112 includes a non-volatile electronically erasable programmable read only memory (EEPROM) and a volatile memory such as a static random access memory (SRAM). The SRAM may be used to provide an SRAM handshake feature that may require a large number of writes to the memory, which may wear out an EEPROM.

RF interface 114 may include hardware for transmitting and receiving data via radio frequency signals. Accordingly, RF interface 114 may include an antenna, transmitter, receiver, and/or transceiver. RF interface 114 may be compliant with the NFC Forum specifications and operate accordingly. RF interface 114 may be used by NFC device 120 to read and/or write data to memory 112.

Wired interface 116 may include one or more wires connecting NFC tag 110 to host 130. In various exemplary embodiments in accordance with the invention, wired interface 116 may be an inter-integrated circuit (I²C) interface. Such a wired interface will be described in further detail below. Any other wired interface for communicating data may also be used. Wired interface 116 may be assigned a slave address for NFC tag 110. Wired interface 116 may be used by host 130 to read and/or write data to memory 112.

Field detection (FD) pin 118 may be an output pin of tag 110. FD pin 118 may indicate whether tag 110 is currently busy on RF interface 114. FD pin 118 may be connected to host 130. In various embodiments in accordance with the invention, FD pin 118 may be used to provide a trigger signal that causes an interrupt on host 130. Such a trigger signal may indicate that data is available for reading on tag 118. FD pin 118 may also allow host 130 to know when tag 110 is available for reading and/or writing via wired interface 116.

NFC device 120 may be any device capable of communicating with tag 110 via RF interface 114. In various exemplary embodiments in accordance with the invention, NFC device 120 may communicate with tag 110 as defined by NFC specifications. NFC device 120 may be a cell phone, mobile phone, smart phone, tablet computer, PDA, or any other computing device.

RF interface 122 may include hardware for transmitting and receiving data via radio frequency signals. Accordingly, RF interface 122 may include an antenna, transmitter, receiver, and/or transceiver. RF interface 122 may be compliant with the NFC Forum specifications and operate accordingly. RF interface 122 may be used by NFC device 120 to read and/or write data to memory 112.

Host 130 may be any device capable of communicating via a wired interface 116. Accordingly, host 130 may be a computing device such as a cell phone, mobile phone, smart phone, tablet, laptop, or desktop computer, or any other computing device. Host 130 may also include other electronic devices. For example, host 130 may include a Bluetooth headset, speakers, video player, or any other electronic device. Host 130 may include office equipment such as printers, facsimile machines, and copiers. Dual interface tag 110 may be connected to host 130 and extend the functionality of host 130 for wireless communications such as NFC.

Dual interface tag 110 may interoperate with RFID and NFC systems. RFID and NFC systems are used for a wide variety of applications including: identification, access, data transfer, payment, coupons, ticketing, and loyalty programs. Dual interface tag 110 may act as a traditional RFID or NFC tag for any of these applications. Dual interface tag 110 may be incorporated into host 130 that is a common electronic device such as a mobile phone, music player, access card, or key to provide a convenient RFID or NFC tag for a user.

Dual interface tag 110 may also provide extended functionality to a variety of hosts 130. For example, dual interface tag 110 may provide for interaction between host 130 and an NFC device 120. A computing device host 130 may store information such as downloaded applications, tickets, or data on dual interface tag 130. That information may then be communicated to any NFC device 120. The SRAM handshake feature may be used to transfer larger amounts of data between a host 130 and NFC device 120. For example, NFC ticketing devices may be used to control access to public transportation, vehicles, offices, and entertainment events. Information may also be transferred via NFC for retail purposes such as payments, digital coupons, and loyalty programs. Accordingly, dual interface tag 110 may be used to bring online information into the NFC environment.

As another example, dual interface tag 110 may provide for configuration or control of an electronic device host 130 by an NFC device 120. For example, dual interface tag 110 may provide control of a stereo system host 130. NFC device 120 may send information such as commands, settings, content, or playlists, to dual interface tag 110. The stereo system host 130 may then read the stored information from dual interface tag 110 and process the information, allowing user control of stereo system host 130 through NFC device 120. The SRAM handshake feature may allow transfer of larger amounts of information and continuous control of the host device. Other electronic devices may operate in a similar manner to allow control through an NFC device 120. For example, an automobile host 130 may receive customization settings via a dual interface from an NFC device held by the driver. An NFC device 120 such as a mobile phone may include multiple applications for controlling different host devices 130.

Figure 2:
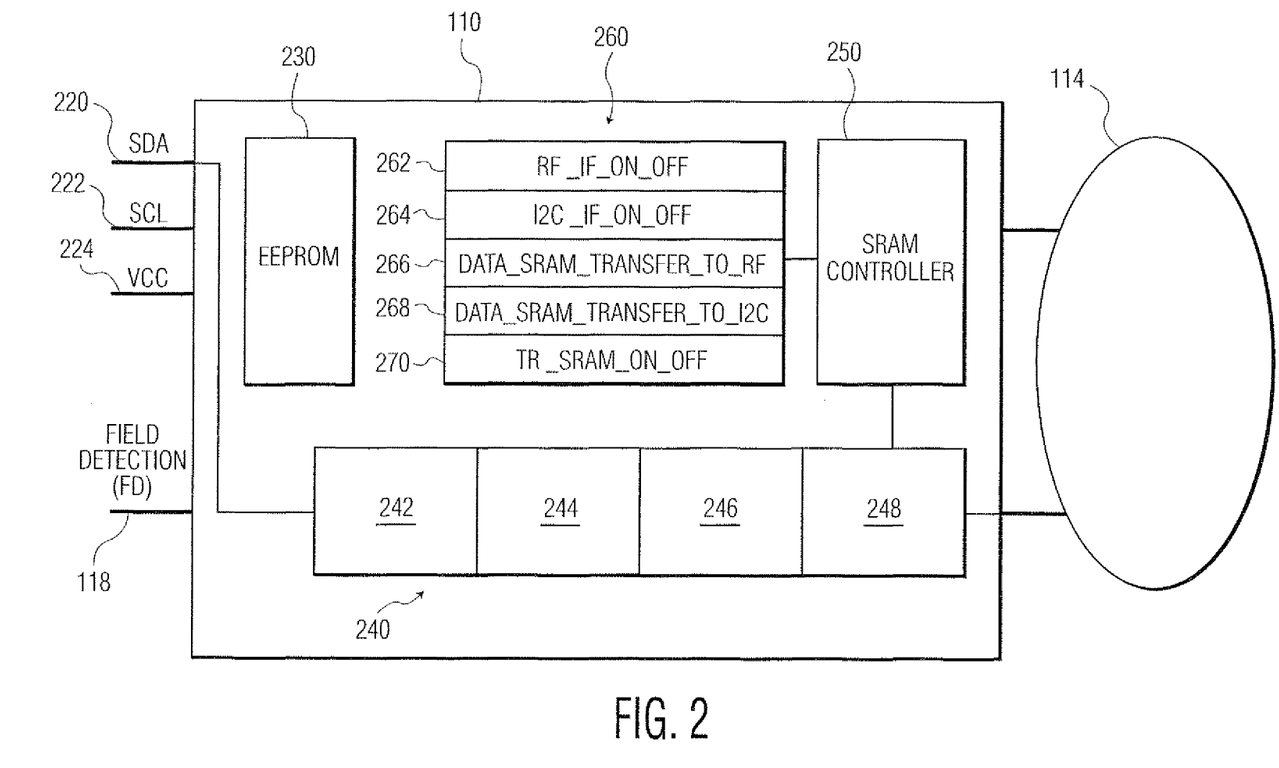
FIG. 2 illustrates an exemplary dual interface tag in accordance with the invention.

FIG. 2 illustrates an exemplary dual interface tag 110. Dual interface tag 110 may include: RF interface 114, field detection pin 118, SDA pin 220, SCL pin 222, VCC pin 224, EEPROM 230, SRAM 240, SRAM controller 250, and registers 260.

SDA pin 220 may be a component of wired interface 116. For example, an SDA pin is defined for an I²C interface. SDA pin 220 may carry data and addresses for wired interface 116.

SCL pin 222 may be a component of wired interface 116. For example, an SCL pin is defined for an I²C interface. SCL pin 222 may provide or receive a clock signal for the wired interface 116. The clock signal may determine the transmission speed of the wired interface 116. SCL pin 222 may also be used by tag 110 to provide a trigger signal indicating that data is ready to be read from SRAM 240. For example, if the tag 110 is a single slave device, the tag 110 may generate a trigger signal using clock stretching. The trigger signal may provide an interrupt for host 130 to request the data.

VCC pin 224 may be a component of wired interface 116. VCC pin 224 may provide power to the tag 110. Accordingly, tag 110 may operate when powered solely via the wired interface 116.

EEPROM 230 is an electronically erasable programmable read only memory. EEPROM 230 may be used by tag 110 to store data. Access to EEPROM 230 may be controlled. For example, EEPROM 230 may be set to a Read-only state such that it cannot be erased or written.

SRAM 240 may be a static random access memory. Other types of random access memory may also be used. SRAM 240 may temporarily store data for transferring between the RF interface 114 and wired interface 116. SRAM 240 may be divided into a plurality of blocks, for example, blocks 242, 244, 246, and 248. Each block may be the same size as a block of EEPROM 230.

SRAM controller 250 may include circuitry for controlling access to SRAM 240. SRAM controller 250 may also include circuitry for locking and signaling the RF interface 114 and wired interface 116. SRAM controller 250 may be configured to detect when a read or write operation is performed on the last block 248 of SRAM 240. When SRAM controller detects a read or write operation on the last block 248, it may set registers 260 to reflect the completed operation and/or generate a trigger signal. In various embodiments in accordance with the invention, SRAM controller 250 may determine which blocks of SRAM 240 are used. For example, if tag 110 receives a request to write fewer than all of the blocks of SRAM 240, SRAM controller 250 may assign the data to the last few blocks of SRAM 240 such that the last block 248 will be written. An application may indicate the size of the data in a header of the request.

Registers 260 may include a plurality of registers for storing flags or status bits. Each register 260 may be a single bit. Registers 260 may include RF_IF_ON_OFF register 262, I2C_IF_ON_OFF register 264, DATA_SRAM_TRANSFER_TO_RF register 266, DATA_SRAM_TRANSFER_TO_I2C register 268, and TR_SRAM_ON_OFF register 270. RF_IF_ON_OFF register 262 may indicate whether the RF interface 114 is currently busy. I2C_IF_ON_OFF register 264 may indicate whether the wired interface 116 is currently busy. DATA_SRAM_TRANSFER_TO_RF register 266 may indicate whether SRAM 240 is currently storing information ready to be read by the RF interface 114. DATA_SRAM_TRANSFER_TO_I2C register 268 may indicate whether SRAM 140 is currently storing information ready to be read by the wired interface 116. TR_SRAM_ON_OFF register 270 may indicate whether the SRAM 140 may be used for a handshake data transfer.

Figure 3:
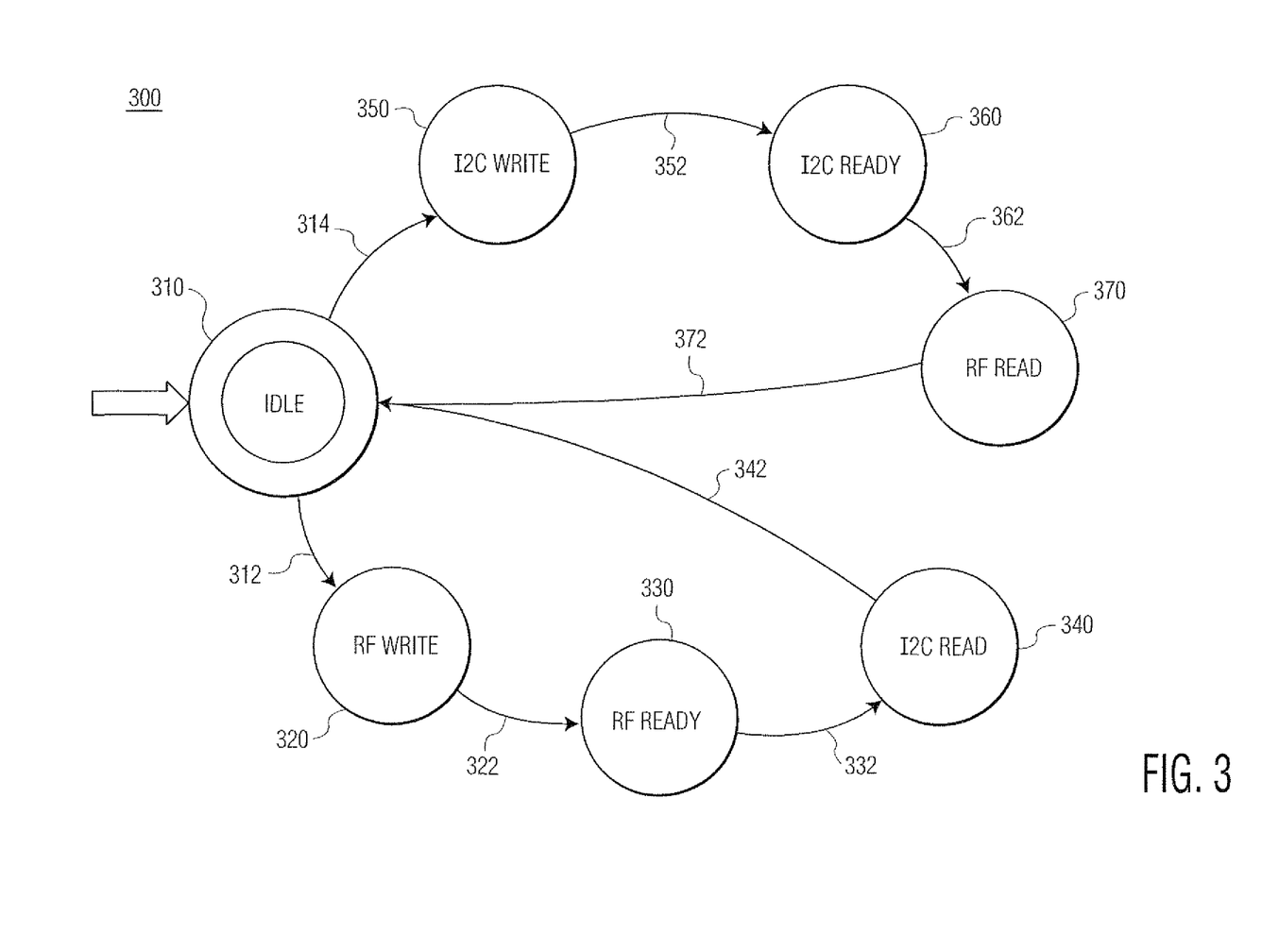
FIG. 3 illustrates a state diagram showing various states of the dual interface tag in accordance with the invention.

FIG. 3 illustrates a state diagram showing various exemplary states for tag 110. Tag 110 may start in an idle state 310. In the idle state, 310 both interfaces 114 and 116 may be inactive. Registers 262, 264, 266, and 268 may be set to 0. If the SRAM handshake is enabled, register 270 may be set to 1. When tag 110 is in the idle state, either interface may initiate a read or a write to EEPROM 230 or SRAM 240.

Tag 110 may transition from idle state 310 to RF write state 320 via transition path 312. Transition path 312 may occur when tag 110 detects an RF field from an NFC device 120. In RF write state 320, register 262 may be set to 1. Tag 110 may receive data from NFC device 120 via the RF interface 114. Tag 110 may write the data to SRAM 240. If host 130 attempts to communicate via wired interface 116, the communication may be blocked.

Tag 110 may transition from RF write state 320 to RF ready state 330 via transition path 322. Transition path 322 may occur when tag 110 detects that the last block 248 has been written with data from the RF interface 114. Register 262 may be set to 0 and register 268 may be set to 1.

Tag 110 may transition from RF ready state 330 to I2C read state 340 via transition path 332. Transition path 332 may occur when tag 110 is addressed on the wired interface 116. Register 264 may be set to 1. Tag 110 may send data stored in SRAM 240 to host 130 via wired interface 116.

Tag 110 may transition from I2C read state 340 to idle state 310 via transition path 342. Transition path 342 may occur when the last block 248 is read. Registers 264 and 268 may be reset to 0.

Tag 110 may transition from idle state 310 to I2C write state 350 via transition path 314. Transition path 314 may occur when tag 110 is addressed on the wire interface 116. In I2C write state 350, register 264 may be set to 1. Tag 110 may receive data from host 130 via the wired interface 116. Tag 110 may write the data to SRAM 240. If NFC device 120 attempts to communicate via RF interface 114, the communication may be blocked.

Tag 110 may transition from I2C write state 350 to I2C ready state 360 via transition path 352. Transition path 352 may occur when tag 110 detects that the last block 248 has been written with data from the wired interface 116. Register 264 may be reset to 0 and register 266 may be set to 1.

Tag 110 may transition from I2C ready state 360 to RF read state 370 via transition path 362. Transition path 362 may occur when tag 110 receives a read command on the RF interface 114. Register 262 may be set to 1. Tag 110 may send data stored in SRAM 240 to NFC device 120 via RF interface 114.

Tag 110 may transition from RF read state 370 to idle state 310 via transition path 372. Transition path 372 may occur when the last block 248 is read. Registers 264 and 262 may be reset to 0.

Figure 4:
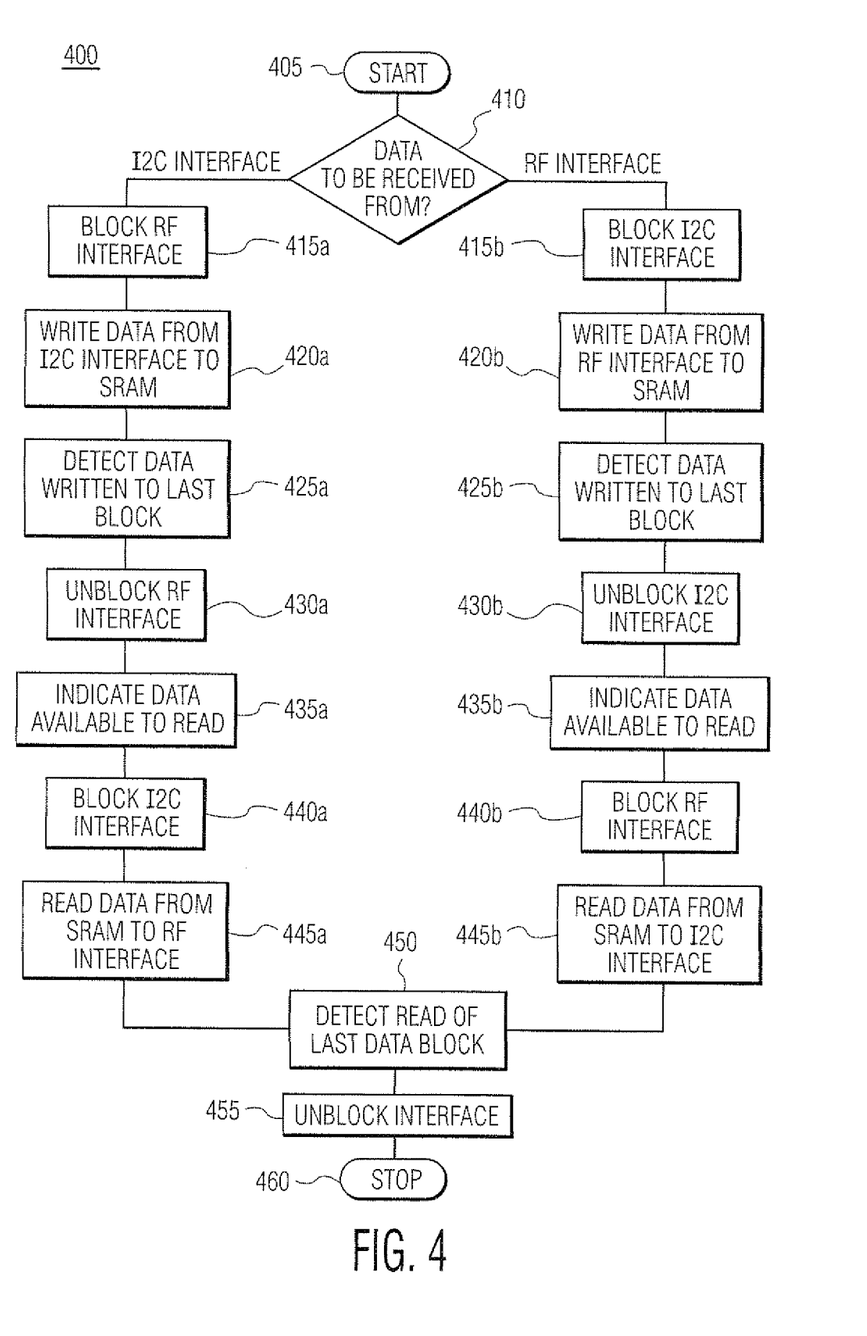
FIG. 4 illustrates a flowchart showing an exemplary method of transferring data using a dual interface tag in accordance with the invention.

FIG. 4 illustrates a flowchart showing an exemplary method 400 of transferring data using a tag 110. Method 400 may be performed by the various components of tag 110. Method 400 may begin at step 405 and proceed to step 410.

In step 410, tag 110 may determine whether NFC device 120 via RF interface 114 or host 130 via wired interface 116 is attempting to send data. If the host is attempting to send data via the wired interface 116, the method 400 may proceed to step 415a. If the NFC device 120 is attempting to send data via the RF interface 114, the method 400 may proceed to step 415b.

In step 415a, tag 110 may lock the RF interface to prevent interruptions to the writing process that may result in corrupt data. Tag 110 may set register 264 to indicate that the tag 110 is being accessed by the wired interface 116.

In step 420a, tag 110 may write data from the wired interface 116 to SRAM 240. The length of the data may be limited to the size of SRAM 240. If the length of the data is equal to the size of SRAM 240, writing may begin at the first block 242. If the length of the data is less than the size of SRAM 240, tag 110 may subtract the length of the data from the size of SRAM 240 to determine which block to begin writing the data.

In step 425a, tag 110 may detect that data has been written to the last block 248 of SRAM 240. In step 430a, tag 110 may unlock the RF interface 114 because the write procedure has finished.

In step 435a, tag 110 may indicate that data is available for reading. Tag 110 may set DATA_SRAM_TRANSFER_TO_RF register 266 to indicate that data is available. NFC device 120 may periodically poll register 266 to determine whether reading is possible.

In step 440a, tag 110 may lock the wired interface 116 in response to receiving a read request from an NFC device 120 via RF interface 114. Locking the wired interface 116 may prevent interference with the read procedure and prevent corruption of the data.

In step 445a, tag 110 may read data from SRAM 240 to RF interface 114. Tag 110 may process a read request from NFC device 120 asking to read the data. The data may be read beginning with the first block 242 and proceeding toward the last block 248.

Steps 415b-445b may be similar to steps 415a-445a except that the relevant interfaces and registers may be switched. In step 415b, tag 110 may lock the wired interface 116 to prevent interruptions to the writing process that may result in corrupt data. Tag 110 may set register 262 to indicate that the tag 110 is being accessed by the RF interface 114.

In step 420b, tag 110 may write data from the wired interface 116 to SRAM 240. The length of the data may be limited to the size of SRAM 240. If the length of the data is equal to the size of SRAM 240, writing may begin at the first block 242. If the length of the data is less than the size of SRAM 240, tag 110 may subtract the length of the data from the size of SRAM 240 to determine which block to begin writing the data.

In step 425b, tag 110 may detect that data has been written to the last block 248 of SRAM 240. In step 430b, tag 110 may unlock the wired interface 116 because the write procedure has finished. Tag 110 may reset the RF_IF_ON_OFF register 262 to indicate that the tag 110 is no longer using the RF interface.

In step 435b, tag 110 may indicate that data is available for reading. Tag 110 may set DATA_SRAM_TRANSFER_TO_I2C register 268 to indicate that data is available. Tag 110 may also generate a trigger signal to indicate that data is available. The trigger signal may generate an interrupt at host 130. In various exemplary embodiments in accordance with the invention, the trigger signal may be sent via a SCL wire of an I2C interface. Alternatively, the trigger signal may be sent by detecting a change in status of the FD pin 118. In either case, the interrupt at host 130 may result in host 130 requesting to read data via the wired interface.

In step 440b, tag 110 may lock the RF interface 114 in response to receiving a read request from host 130 via wired interface 116. Locking the RF interface 114 may prevent interference with the read procedure and prevent corruption of the data.

In step 445b, tag 110 may read data from SRAM 240 to wired interface 116. Tag 110 may process a read request from host 130 asking to read the data. The data may be read beginning with the first block 242 and proceeding toward the last block 248.

In step 450, tag 110 may detect that the last block of SRAM 240 has been read. In step 455, tag 110 may unlock any locked interfaces. Tag 110 may also reset registers 266 and/or 268 to indicate that no unread data is available. The method 400 may then proceed to step 460, where the method ends. In various embodiments in accordance with the invention, the method 400 may be repeated as often as necessary to transfer data between NFC device 120 and host 130. If SRAM 240 is relatively small compared to the data, the data can be sent in multiple chunks corresponding to the size of the SRAM 240.

According to the foregoing, various exemplary embodiments in accordance with the invention provide for a dual interface tag and method of using the tag to transfer data between devices. In particular, by controlling access to a random access memory, data can be transferred from a device in communication with a first interface to a device in communication with a second interface of a dual interface tag.

It should be apparent from the foregoing description that portions of various exemplary embodiments of the invention may be implemented in hardware and/or firmware. Furthermore, various exemplary embodiments in accordance with the invention may be implemented as instructions stored on a non-transitory machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principals of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. An integrated circuit (IC) comprising:
   a radio frequency (RF) interface;
   a wired interface connectable to a host;
   a volatile memory having a first block and a last block configured to store data transferred between the RF interface and the wired interface; and a memory controller configured to detect when the last block of the volatile memory has been written and to indicate that the volatile memory is ready to read.

2. The IC of claim 1 further comprising an electronically erasable programmable read only memory (EEPROM).

3. The IC of claim 1, wherein the IC is a near field communication (NFC) tag.

4. The IC of claim 1, wherein the memory controller is further configured to detect when the last block of the volatile memory has been read and to place the IC in an idle state.

5. The IC of claim 1, wherein the wired interface is an Inter-Integrated Circuit (I2C) or a system management bus (SMB).

6. The IC of claim 1, wherein the memory controller is further configured to provide a trigger signal to the host via the wired interface when the RF interface writes to the last block of the volatile memory.

7. The IC of claim 1, further comprising a field detection pin that indicates the presence of an RF field, wherein the memory controller is further configured to use the field detection pin to provide a trigger signal to the host.

8. The IC of claim 1, further comprising a first register configured to indicate the status of the RF interface and a second register configured to indicate the status of the wired interface, wherein the memory controller is configured to lock one of the RF interface and the wired interface based on the first register and the second register.

9. The IC of claim 1, further comprising a transfer register configured to indicate whether data stored in the volatile memory has been read.

10. A method performed by a tag for transferring data between a first interface and a second interface, the method comprising:
   determining that data is to be received on the first interface;
   blocking the second interface;
   writing data from the first interface to a volatile memory;
   detecting that the last block of the volatile memory has been written;
   unblocking the second interface;
   indicating that data is available for reading on the second interface;
   blocking the first interface; and
   reading data from the volatile memory to the second interface.

11. The method of claim 10, wherein the first interface is a radio frequency interface (RF) in communication with an RF device and the second interface is a wired interface in communication with a host.

12. The method of claim 11, further comprising sending a trigger signal to the host via the wired interface when detecting that the last block of the volatile memory has been written by the RF device.

13. The method of claim 10, wherein the first interface is a wired interface in communication with a host and the second interface is a radio frequency interface (RF) in communication with an RF device.

14. The method of claim 10, further comprising:
   detecting that the last block of the volatile memory has been read; and
   setting the tag to an idle state.

15. The method of claim 10, wherein the tag is an NFC Forum tag.

16. The method of claim 10, wherein the step of indicating that data is available for reading on the second interface comprises setting a register associated with the second interface that can be read by the second interface.

17. The method of claim 10, wherein the step of blocking the second interface comprises setting a register associated with the first interface to indicate that the first interface is in use.

18. The method of claim 10, further comprising reading a register configured to indicate whether a handshake feature is permitted.

19. A host device comprising:
   a first wired interface connected to a dual interface tag, the dual interface tag comprising:
   a radio frequency (RF) interface,
   a second wired interface connected to the first wired interface of the host,
   a volatile memory having a first block and a last block configured to store data transferred between the RF interface and the wired interface, and
   a memory controller configured to detect when the last block of the volatile memory has been written and to indicate that the volatile memory is ready to read.

20. The host device of claim 19, wherein the host device is one of: a phone, a computer, an automobile, an audio player, a video player, a copier, a facsimile machine, and a printer.

* * * * *